(12) United States Patent
Chang et al.

(10) Patent No.: US 7,167,605 B2
(45) Date of Patent: Jan. 23, 2007

(54) PERIPHERAL COUPLED TRAVELING WAVE ELECTRO-ABSORPTION MODULATOR

(75) Inventors: William S. C. Chang, San Diego, CA (US); Paul K. L. Yu, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 10/519,204

(22) PCT Filed: Jun. 27, 2003

(86) PCT No.: PCT/US03/20352

§ 371 (c)(1),
(2), (4) Date: Jan. 27, 2005

(87) PCT Pub. No.: WO2004/003600

PCT Pub. Date: Jan. 8, 2004

(65) Prior Publication Data

US 2005/0117829 A1     Jun. 2, 2005

Related U.S. Application Data

(60) Provisional application No. 60/392,073, filed on Jun. 28, 2002.

(51) Int. Cl.
*G02F 1/17* (2006.01)

(52) U.S. Cl. .............................. 385/2; 385/30

(58) Field of Classification Search .................. None
See application file for complete search history.

(56) References Cited

U.S. PATENT DOCUMENTS

| | | | |
|---|---|---|---|
| 5,082,342 A | * | 1/1992 | Wight et al. .................... 385/8 |
| 5,608,234 A | | 3/1997 | Jiang |
| 5,892,857 A | * | 4/1999 | McCallion .................... 385/1 |
| 5,982,799 A | | 11/1999 | Bour et al. |
| 6,148,013 A | | 11/2000 | Geels et al. |

* cited by examiner

*Primary Examiner*—Michelle Connelly-Cushwa
*Assistant Examiner*—Jerry T. Rahll
(74) *Attorney, Agent, or Firm*—Greer, Burns & Crain, Ltd.

(57) ABSTRACT

A method for optical modulation comprising the steps of guiding an optical wave in an optical waveguide, the optical wave having an evanescent tail; and applying a modulation voltage to the evanescent tail.

21 Claims, 2 Drawing Sheets

PERIPHERAL COUPLED TRAVELING WAVE ELECTRO-ABSORPTION MODULATOR

PRIORITY CLAIM

Applicants claim priority benefits under 35 U.S.C. § 119 on the basis of patent application No. 60/392,073, filed Jun. 28, 2002.

TECHNICAL FIELD

The invention is in the optoelectronic field. The invention is applicable to optical modulation systems.

BACKGROUND ART

Optical modulators are used in a variety of applications. Controlled modulation of light is useful in analog systems to produce an output proportional to the input signal. Digital optical systems, such as fiber optic communication systems, use optical modulators to impose digital signals on light. Digital optical modulators as signaling devices may also form the basis for optical memories and general computer devices.

One form of optical modulation is electro-absorption (hereinafter, "EA") modulation. In conventional EA modulation, EA material is an integral part of the optical waveguide. Consequently, the design of the microwave waveguide is constrained by the optical waveguide design. It is necessary to trade off optical and microwave waveguide design considerations.

As a result, after considering various trade-offs, existing optimized EA modulators are typically 200 µm long or shorter, and the EA layer is a few thousand angstroms thick over the width of the waveguide. At such short interaction lengths, they do not take full advantage of traveling wave interactions. The size of the optical mode is approximately 1 to 2 µm, requiring expansive and precise coupling to single mode optical fibers. The high density of the optical field in the EA layer of an EA modulator of such a small mode also limits the saturation optical power of the modulator typically to a few milliwatts.

DISCLOSURE OF INVENTION

An embodiment of the present invention is directed to a method for optical modulation comprising the steps of guiding an optical wave in an optical waveguide, the optical wave having an evanescent tail; and applying a modulation voltage to the evanescent tail.

BEST MODE OF CARRYING OUT THE INVENTION

Broadly stated, embodiments of the invention use peripheral coupling of a microwave wave and an optical wave. With the invention, strong EA modulation may be achieved. Embodiments of the invention may achieve number of benefits, including separation of design optimization for optical waveguides and microwave waveguides working together to modulate an optical wave; provision of a millimeters-long synchronized length for interaction between a microwave wave and an optical wave obtaining a very low modulation voltage; microwave transmission line design with low attenuation and impedance matching to the source; relatively easy optical coupling to fibers; and large optical saturation power compared to other EA modulators.

Figure 1:
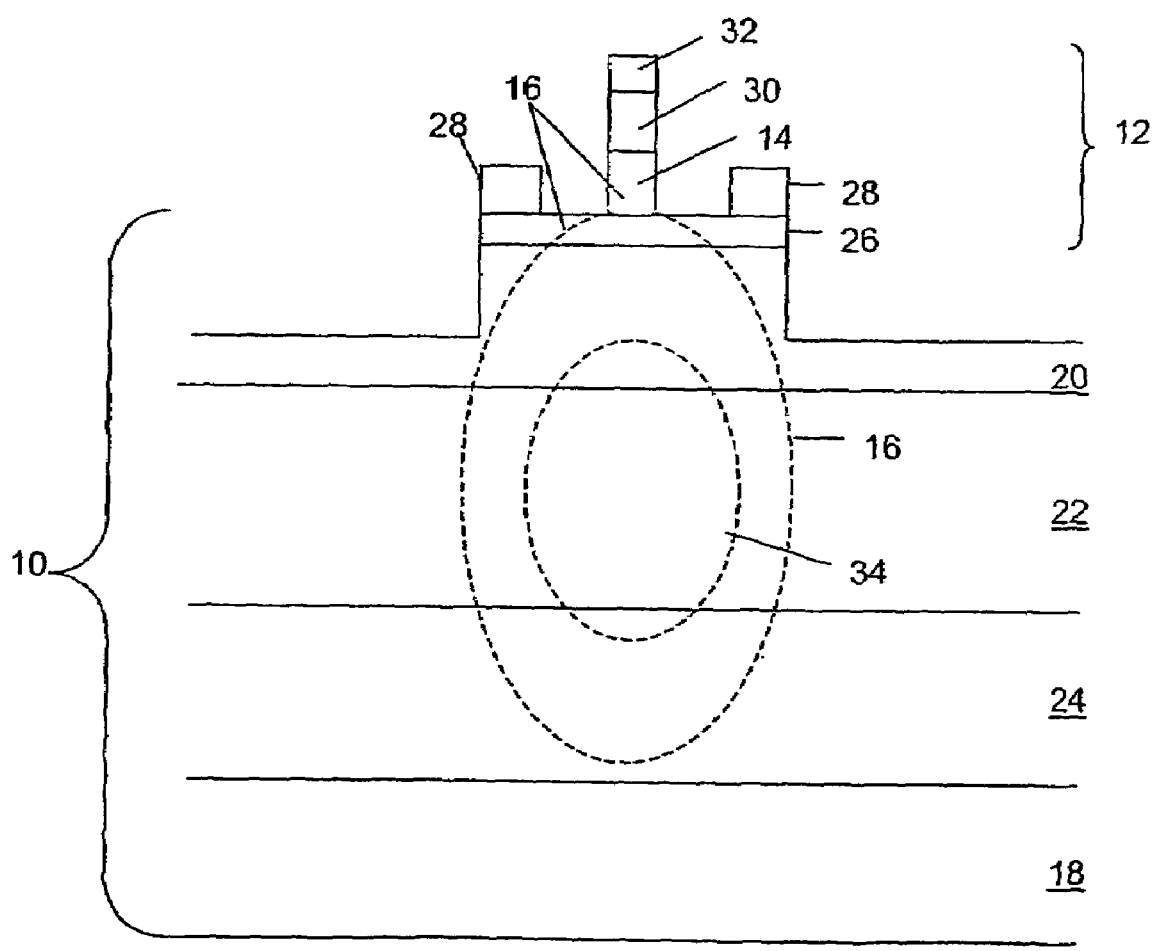
FIG. 1 is a schematic cross-sectional view of an embodiment of the invention.

Turning now to FIG. 1, showing a schematic cross-section of an embodiment of the invention, an apparatus for optical modulation includes an optical waveguide 10 and a microwave waveguide 12. Microwave waveguide 12 has an EA material 14 sized and placed such that, for an optical wave of interest guided in optical waveguide 10, EA material 14 is located in an evanescent region 16, a region occupied by the optical wave's evanescent tail when the optical wave of interest is being guided in optical waveguide 10.

Optical waveguide 10 includes substrate 18, an N-doped upper semiconducting cladding layer 20, a semiconducting core layer 22 disposed between substrate 18 and upper semiconducting cladding layer 20, and a lower semiconducting cladding layer 24 disposed between substrate 18 and semiconducting core layer 22. A heavily doped N-contact layer 26 is disposed on upper semiconducting cladding layer 20, and N-contact layer 26 and the upper part of upper semiconductor cladding layer 20 are etched to form a ridge for optical waveguide 10.

Semiconducting core layer 22 has a higher index of refraction than that of lower semiconducting cladding layer 24 and of upper semiconducting cladding layer 20. This structure provides vertical confinement of an optical wave in optical waveguide 10. The ridge structure of N-contact layer 26 and the upper part of upper semiconducting cladding layer 20 provides lateral confinement of the optical wave in optical waveguide 10.

Optical waveguide 10 and microwave waveguide 12 share N-contact layer 26 within the ridge structure. Microwave waveguide 12 further includes two N-contacts 28, which are disposed on an upper surface of N-contact layer 26 at the outer edges of that upper surface.

Microwave waveguide 12 further includes an EA material 14 disposed on N-contact layer 26 between the two N-contacts 28, a P-contact layer 30 disposed on EA material 14, and a P-contact 32 disposed on P-contact layer 30. EA material 14 may be formed from a Group III–V compound material. One embodiment of the invention uses InGaAsP for EA material 14. Another embodiment of the invention uses GaInAlAs for EA material 14.

When guided in optical waveguide 10, an optical wave of interest is primarily in semiconductor core layer 22, but it also extends into lower semiconductor cladding layer 24, upper semiconductor cladding layer 20, N-contact layer 26, EA material 14, and beyond. Most of the optical intensity of an optical wave of interest when guide in optical waveguide 10 is located in a main mode that occupies main mode region 34, and the amplitude of the optical wave decays as it extends further away from semiconductor core layer 22. The part of the decaying optical wave in lower semiconducting cladding layer 24, the upper semiconducting cladding layer 20, N-contact layer 26, and EA material 14 is called the evanescent field, evanescent wave, or evanescent tail. The region in which the evanescent tail is present when an optical wave is being guided in optical waveguide 10 is shown as evanescent region 16. As the optical properties (i.e., the absorption coefficient and the refractive index) of EA material 14 are changed by the electric field produced by the modulation voltage applied to the microwave waveguide 12, the optical properties of EA material 14 in turn affect the propagation of the optical wave in optical waveguide 10 through the evanescent tail in evanescent region 16, enabling the modulation of the optical wave by the microwave voltage. The coupling of EA material 14 in the microwave waveguide 12 to the modulation of the optical wave in the optical waveguide 10 via the evanescent field in evanescent region 16 constitutes the peripheral coupling of the microwave waveguide 12 and the optical waveguide 10.

Figure 2:
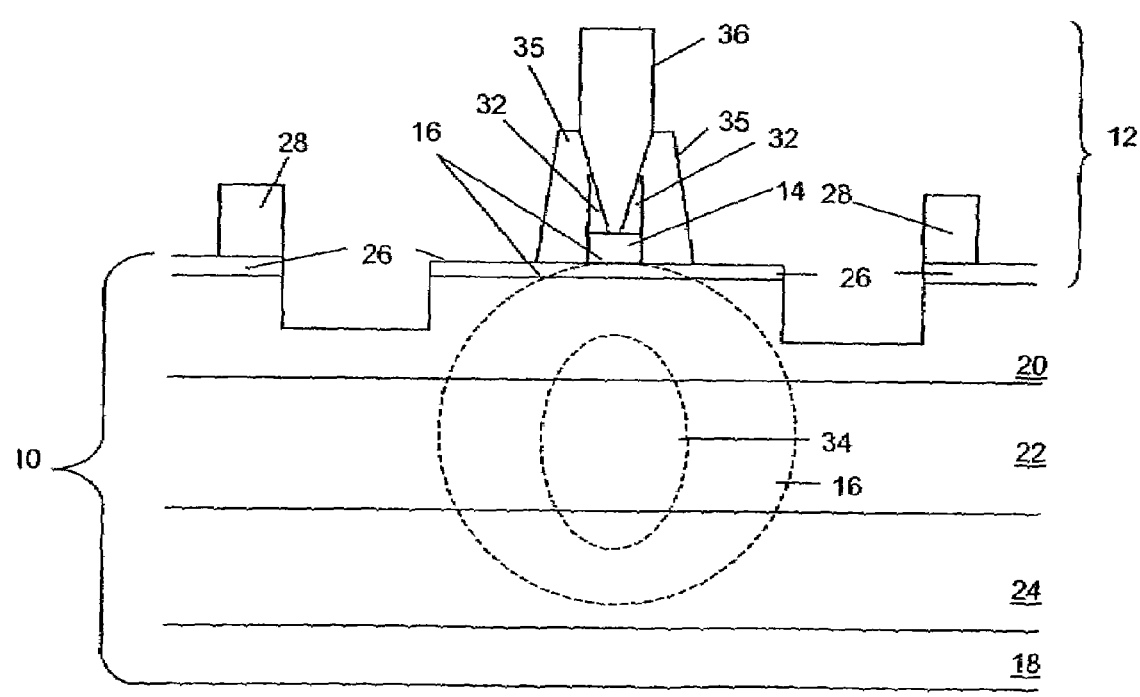
FIG. 2 is a schematic cross-sectional view of another embodiment of the invention.

FIG. 2 shows a schematic cross-sectional view of another embodiment of the invention. The structure of the substrate 18, lower semiconducting cladding layer 24, and semiconducting core layer 22 is the same as in FIG. 1. In this embodiment of the invention, upper semiconducting cladding layer 20 and N-contact layer 26 are etched differently to form a different contact structure and a different ridge structure for lateral confinement of the optical waveguide 10 mode. Two N-contacts 28 for the microwave waveguide 12 are disposed on N-contact layer 26, one on either side of main mode region 34 and evanescent region 16 of optical waveguide 10. N-contact layer 26 and upper semiconducting cladding layer 20 are etched away between each N-contact 28 and main mode region 34 and evanescent region 16 of optical waveguide 10 to form a ridge for lateral confinement of an optical wave in optical waveguide 10. Optimizations of embodiments of the invention will place the N-contacts 28 relatively far away from the ridge structure of upper semiconducting cladding layer 20 and N-contact layer 26. In one embodiment of the invention, the N-contacts 28 are disposed at each edge of the etched-away areas opposite the ridge formed by the etched-away areas.

On the ridge, N-contact layer 26 is shared by optical waveguide 10 and microwave waveguide 12 in this embodiment of the invention. Microwave waveguide 12 includes N-contacts 28 disposed on N-contact layer 26 as discussed above and a structure on the ridge of optical waveguide 10 that includes EA material 14 disposed on N-contact layer 26, P-contact layer 32 disposed on either side of a top surface of EA material 14, insulators 35 on either side of EA material 14 and P-contact layer 32, and a truncated "V"-shaped P-contact 36 with the truncated tip of the "V" in contact with EA material 14, disposed between either side of P-contact layer 32 and between insulators 35. Insulators 35 may be made of polyimide, for example.

Use of truncated "V"-shaped P-contact 36 surrounded by insulators 35 reduces the capacitance of microwave waveguide 12. A relatively thick (referring to the vertical dimension in FIG. 2) truncated "V"-shaped P-contact 36 reduces microwave loss in microwave waveguide 12. The tip of truncated "V"-shaped P-contact 36 increases the electric field in EA material 14. An approximate $5.0 \times 10^6$ V/m strength is necessary for modulation. This may be achieved by all inventive embodiments. The FIG. 2 embodiment achieves high field strengths at especially low drive voltages. For example, at a drive voltage of 1 V, an electric field of $1.0 \times 10^7$ V/m may be achieved in parts of EA material 14. In an embodiment of the invention, the tip of truncated "V"-shaped P-contact 36 need be only 0.5 µm wide, but the width and position of the tip do not need to be maintained with a high degree of accuracy.

In an embodiment of the invention, EA material 14 is a multiple quantum well material. EA material 14 typically consists of several quantum wells. For instance, for 1550 nm wavelength modulation, EA material 14 may be a five-quantum-well stack each of which is made of an InGaAsP well (optimally 100 Å thick with a bandgap energy of 0.8 eV) and an InGaAsP barrier (optimally 70 Å thick with a bandgap energy of 1.08 eV). In another embodiment of the invention, EA material 14 is made of Franz-Keldysh effect materials, e.g., InGaAsP that is 1000 Å thick with a bandgap energy of 0.85 eV, optimized for 1550 wavelength modulation.

One of the benefits of embodiments of the invention is that those embodiments permit separation of design optimization for optical waveguide 10 and microwave waveguide 12 working together to modulate an optical wave. A discussion of certain design considerations permits description of preferred embodiments of the invention, using the exemplary embodiments illustrated in FIGS. 1 and 2 among several embodiments.

Let z be the direction of propagation of optical waveguide 10 and microwave waveguide 12. $I_o$ is the incident optical power in optical waveguide 10 at the input (z=0) and I(z=L) is the transmitted optical power in optical waveguide 10 at the output end (z=L). The microwave wave field in EA material 14 is given by the microwave voltage at z, $V_{RF}(z)$, divided by $d_{i,eff}$, the effective thickness of EA material 14. For microwave waveguide 12 at low frequencies, $d_{i,eff}$ is approximately the physical thickness of EA material 14. At high frequencies, $d_{i,eff}$ may be larger than the physical thickness of EA material 14 and may be determined from microwave field analysis. The transmission function of any traveling-wave EA modulator (hereinafter, "TWEAM") in response to a continuous-wave microwave voltage $V_R \cos \omega t$ at z=0 is:

$$I(z=L)/I_o(z=0)=T=\eta_{ins} \cdot e^{\Gamma \alpha_{bias} L} \cdot e^{-\Gamma \Delta \alpha_{eff}(\Delta F) L} \quad (1)$$

where
$\Gamma$=optical confinement factor of EA material 14;
$\eta_{nis}$=insertion efficiency=$C_{in}C_{out}(1-R)^2 \, e^{-\alpha_o L}$;

$$\Delta \alpha_{eff} L = \text{integrated } EA \text{ over } L = \int_0^L \Delta \alpha(\Delta F(z)) dz;$$

$$\Delta F(z) = \text{electric field seen by optical wavefront} = \frac{V_{RF} \cdot e^{-(\alpha_{rf} z/2)}}{d_{i, eff}} \cos(\omega t - \delta z);$$

$\delta$=phase mismatch of microwave wave and optical wave= $(\eta_{mircowave} - \eta_{eff,opt})\omega/c$; and
$\alpha_{rf}$=microwave propagation loss per unit length.

A modulation voltage $\Delta F$ will create a $\Delta \alpha_{eff}$ that will change transmission T. The optimization of the $\Delta \alpha$ (as that measured from the biasing voltage) by the $\Delta F$ is primarily a materials issue. In addition, modulation of T is affected by L, $\Gamma$, $\eta_{ins}$, $\alpha_{bias}$, $\delta$, $\alpha_{rf}$, and $d_{i,eff}$.

When microwave waveguide 12 is perfectly impedance matched at its input and the output ends and when there is no microwave propagation loss, $V_{RF}$ is just a constant (half of the microwave source voltage). When there are mismatches at the input and output end or attenuation, $V_{RF}$ is a function of z that consists of attenuated forward and backward propagating waves. Described herein is the effect of microwave attenuation as it reduces the magnitude of $V_{RF}$ as z increases from 0, without describing $V_{RF}(z)$ mathematically. The insertion efficiency $\eta_{ins}$ consists of the coupling efficiency to the laser or the fiber at the input and the output ($C_{in}C_{out}$), the Fresnel reflections at the input and the output $((1-R)^2)$ and the optical wave residual propagation loss ($e^{-\alpha_o L}$, excluding the absorption due to the EA effect). $e^{-\Gamma \alpha_{bias} L}$ represents the reduction of the transmission T due to the EA effect of the bias voltage. At zero bias voltage, $e^{-\Gamma \alpha_{bias} L}=1$.

Equation (1) describes a modulation voltage that has a time variation of cos ωt. In that case, matching of $n_{microwave}$ and $n_{optical}$ (i.e., matching of the microwave and optical phase velocities or δ=0) will yield the largest $\Delta\alpha_{eff}$ for a given $\alpha_{rf}$ and $V_{RF}/d_{i,eff}$. For pulse modulation, Eqn. (1) will be modified. In that case, the matching of the optical and microwave group velocities will achieve the most effective modulation. Clearly, the most effective $\Delta\alpha_{eff}$ for a given drive voltage is obtained when there is the smallest $d_{i,eff}$, least microwave attenuation, best matching of phase and/or group microwave and optical velocities and best impedance matching of microwave waveguide 12 to the microwave driver. In addition, the smaller the Γ, the smaller the density of the optical radiation in EA material 14, and the larger the saturation limit of the total optical power modulated by embodiments of the invention. The larger the optical mode, the smaller the propagation loss of optical waveguide 10 caused by scattering, and the more conveniently embodiments of the invention may be coupled efficiently to single mode optical fibers.

In digital applications, the bias voltage for the on-state is normally zero. Thus, $I_{on}=I_oT=I_o\eta_{ins}$ at the on-state. In an embodiment of the invention, $C_{in}C_{out}$ is maximized, R is minimized, $\alpha_{rd}$ is minimized, and $\alpha_o$ is minimized. The maximum L that can be used will depend on the insertion loss allowed, $C_{in}C_{out}$, R, and the residual propagation loss $\alpha_{rf}$ and $\alpha_o$. At the off-state, the output power is $I_{off}$ and $$I_{off}/I_{on}=\text{extinction ratio}=e^{-\Gamma\Delta\alpha_{eff}(\Delta F)L} \qquad (2)$$

The most effective modulator would have the smallest $V_{RF}$ that must be used to achieve a given required extinction ratio, requiring the most sensitive $\Delta\alpha(\Delta F)$ and the largest ΓL in optical waveguide 10, plus the smallest $d_{i,eff}$ in the microwave waveguide 12. To obtain large $\Delta\alpha_{eff}$ for a given $d_{i,eff}$ and a given $\Delta\alpha(\Delta F)$, the best group velocity matching, the least microwave attenuation, and the best matching to the driver circuit are required in microwave waveguide 12. Much better overall performance can be obtained by using small Γ and large L (L will be limited by $\alpha_{rf}$ and $\alpha_o$) in embodiments of the invention. The Γ is kept as large as possible as long as the optical power is sufficient for the application, and the microwave/optical coupling configuration is sufficiently weak to achieve the microwave objectives (very small $d_{i,eff}$, low attenuation, plus velocity and impedance matching) without affecting seriously the optical design that gives large $\eta_{ins}$, relatively easy coupling, and large L. Embodiments of the invention may place microwave waveguide 12 away from the center of a ridge structure of N-contact layer 26 and the upper part of upper semiconducting cladding layer 20 to reduce $\alpha_o$. A result of embodiments of the invention is a large ΓL as well as a large $\Delta\alpha_{eff}$ using small drive voltage.

When the Franz-Keldysh effect is used for EA, $e^{-\Gamma\Delta\alpha_{eff}L}$ will be less sensitive to optical wavelength change. A Franz-Keldysh peripheral coupling TWEAM may be designed to achieve a minimum extinction ratio for a group of wavelengths in Wavelength Division Multiplexing ("WDM") applications. Since embodiments of the invention allow microwave waveguide 12 be placed on one side of optical waveguide 10, other optical structures such as a periodic structure may also be added to optical waveguide 10 from the top to achieve desired chirping effects. Novel structures for EA material 24 such as inner barrier step quantum well ("IQW") material may also be used to control chirping effects.

In analog applications, the modulation voltage is a small signal to the bias voltage. The criteria used to measure the link performance (with matched impedance at the input and the output) is the RF gain under a given bias condition, $$G_{RF}=(I_o\cdot\eta_{ins}\cdot\partial T/\partial V\cdot\eta_{det})^2\cdot R_{in}\cdot R_{in}\cdot R_{out} \qquad (3)$$

where $\eta_{det}$ is the detector efficiency, V is the input RF modulation voltage, and $R_{in}$ and $R_{out}$ are the source and load resistance at the detector. Under a given bias condition, $$T=\eta_{ins}\cdot e^{-\Gamma\alpha_{bias}L}\cdot e^{-\Gamma L\Delta\alpha_{eff}(F_m\cos\omega t)} \qquad (4)$$

$$\frac{\partial T}{\partial V_m}=-\frac{\Gamma L}{d_{i,eff}}\eta_{ins}\cdot e^{-\Gamma L\alpha_{bias}}\cdot\frac{\partial \Delta\alpha_{eff}}{\partial F_m}\bigg|_{bias}$$

Here the modulation field in EA material 24 is $F_m$, $F_m=V_m/d_{i,eff}$. $V_m$ is produced by the RF drive voltage V. Dependent on the $\alpha_o$ and $\alpha_{bias}$, there is a value of optimum L that maximizes $\partial T/\partial V_m$. In addition, $\alpha_{bias}$ and $\partial\Delta\alpha_{eff}/\partial F_m$ also vary as the bias voltage is varied. The best RF gain is obtained with the highest $\eta_{ins}$, the largest $I_o$, and the largest $\partial T/\partial V$. $\partial T/\partial V$ is maximized by the optimum ΓL and the smallest $d_{i,eff}$. Embodiments of the invention permit use of small Γ and large L to obtain the optimum ΓL. $I_o$, limited by saturation, can be increased by reducing Γ. High $\eta_{ins}$ with relatively easy coupling is obtained by using a large optical mode. An optimal design of microwave waveguide 12 should yield the smallest $d_{i,eff}$ and the largest $\partial\Delta\alpha_{eff}/\partial F_m$. Since $\partial T/\partial V_m$ contains $e^{-\alpha_o l}$, the design of optical waveguide 6 should have $\alpha_o L\ll\alpha_{bias}\Gamma L$. When $\alpha_o L\ll\alpha_{bias}\Gamma L$, the maximum $\partial T/\partial V_m$ occurs approximately at $e^{-bias\Gamma L}=0.5$. At this optimum ΓL the maximum $\partial T/\partial V_m$ depends only on $d_{i,eff}$, $\alpha_{bias}$ and $\partial\Delta\alpha_{eff}/\partial F_m$. Besides RF gain, the other important consideration in analog applications is the reduction of non-linear distortion. A number of techniques for reduction of non-linear distortion may be realized in embodiments of the invention.

Since embodiments of the invention allow high $\eta_{ins}$ and large $\partial T/\partial V$, $G_{RF}>1$ may be obtained at large $I_o$. In that case, wide bandwidth RF amplification may be achieved that cannot be obtained electronically. In principle, such a RF amplifier may be integrated on the same chip. As with embodiments of the invention for digital applications, embodiments of the invention using the Franz-Keldysh effect may be used for various adjacent wavelengths with the RF gain controlled by adjustment of bias voltage.

While various embodiments of the present invention have been shown and described, it should be understood that modifications, substitutions, and alternatives are apparent to one of ordinary skill in the art. Such modifications, substitutions, and alternatives can be made without departing from the spirit and scope of the invention, which should be determined from the appended claims.

Various features of the invention are set forth in the appended claims.

The invention claimed is:

1. An apparatus for optical modulation, the apparatus comprising:
   an optical waveguide; and
   a microwave waveguide, said microwave waveguide having an electro-absorptive material sized and placed such that, for an optical wave of interest guided in said optical waveguide, the electro-absorptive material is located in an evanescent region occupied by the optical wave's evanescent tail when the optical wave is being guided in said optical waveguide.

2. The apparatus recited in claim 1, wherein
said optical waveguide includes
a substrate;
an N-contact layer;
an upper semiconducting cladding layer disposed between said substrate and said N-contact layer;
a semiconducting core layer disposed between said substrate and said upper semiconducting cladding layer; and
a lower semiconducting cladding layer disposed between said substrate and said semiconducting core layer; and
wherein N-contact layer and an upper part of upper semiconducting cladding layer are etched down to form a ridge.

3. The apparatus recited in claim 2, wherein
said microwave waveguide includes
two N-contacts disposed on said N-contact layer;
said electro-absorptive material is disposed between and equidistant from said N-contacts on said ridge of said upper semiconducting cladding layer;
a P-contact layer disposed on said BA material; and
a P-contact disposed on said P-contact layer.

4. The apparatus recited in claim 3, wherein
said N-contacts are disposed at each outer edge of said ridge of said N-contact layer.

5. The apparatus recited in claim 2, wherein
said microwave waveguide includes
two N-contacts disposed on said N-contact layer, each of said N-contacts being disposed on either side of a main mode region and said evanescent region of said optical waveguide, wherein said N-contact layer and said upper semiconducting cladding layer have an etched-away area between each of said N-contacts and said main mode region and said evanescent region of optical wave guide to form a ridge;
said electro-absorptive material disposed on said N-contact layer on said ridge;
a P-contact layer disposed on said electro-absorptive material on either side of a top surface of said electro-absorptive material;
two insulators disposed on said N-contact layer in contact with side surfaces of said electro-absorptive material, wherein each of said insulators is in contact with said P-contact layer, and wherein said P-contact layer and said insulators form an inverted V-shaped groove with a truncated tip at said top surface of said electro-absorptive material; and
a P-contact disposed in said V-shaped groove and extending at least to a top surface of each of said insulators.

6. The apparatus recited in claim 5, wherein
said N-contacts are disposed at each edge of said etched-away areas opposite said ridge formed by said etched-away areas.

7. The apparatus recited in claim 5, wherein said apparatus
has a microwave modulation voltage less than or equal to 0.3 V,
has an optical saturation power of equal to or greater than 100 mW,
has an operating bandwidth equal to or greater than 40 GHz,
has an effective thickness of EA material, $d_{i,eff}$, less than or equal to 0.1 μm, and
has a microwave propagation loss per unit length, $\alpha_{rf}$, less than or equal to 3 dB/mm;
is capable of having a microwave wave guide in microwave waveguide and an optical wave guided in optical waveguide wherein a phase velocity of the microwave wave and a phase velocity of the optical wave are equal; and
microwave waveguide has an impedance capable of being matched to a microwave driver, the microwave driver being capable of supply a microwave wave to be guided in said microwave waveguide.

8. The apparatus recited in claim 5, wherein:
said microwave waveguide includes a thin intrinsic layer of electroabsorption material;
said P-contact is shaped as a microwave transmission line such to apply a maximized microwave field to the thin layer of electroabsorption material for a predetermined applied microwave voltage.

9. The apparatus recited in claim 1, wherein
said electro-absorptive material is a Franz-Keldysh material.

10. The apparatus recited in claim 1, wherein
said electro-absorptive material is a group III–V compound material.

11. The apparatus recited in claim 1, wherein
said electro-absorptive material is InGaAsP.

12. The apparatus recited in claim 1, wherein
said electro-absorptive material is GaInAlAs.

13. The apparatus recited in claim 1, wherein
said electro-absorptive material is a multiple quantum well material.

14. The apparatus recited in claim 1, wherein
an optical confinement factor of said electro-absorption material, Γ, between and 1% and 5% enables the optical modulation of an optical power equal to or greater than 100 mW.

15. The apparatus recited in claim 1, wherein said optical waveguide has a sufficiently large mode such that, at high input optical power, the saturation of electroabsorption effect by photo generated carriers is avoided and the largest optical confinement factor is obtained for efficient modulation within the allowed saturation limit.

16. A method for optical modulation, said method comprising the steps of:
guiding an optical wave in an optical waveguide, said optical wave having an evanescent tail; and
applying a modulation voltage to said evanescent tail; further comprising a step of:
positioning an electro-absorptive material in said evanescent tail of said optical wave; and
wherein said step of applying a modulation voltage to said evanescent tail is performed by applying said modulation voltage to said electro-absorptive material.

17. The method recited in claim 16, wherein said step of guiding said optical wave includes direct coupling a single mode fiber optical wave into said waveguide.

18. The method recited in claim 17, wherein said optical waveguide has a mode size to match the mode size of single mode fiber such that high coupling efficiency is obtained from and to single mode fiber with large coupling alignment tolerance.

19. The method recited in claim 16, wherein said modulation voltage is analog.

20. The method recited in claim 16, wherein said modulation voltage is digital.

21. A method for optical modulation, said method comprising the steps of:
guiding an optical wave in an optical waveguide, said optical wave having an evanescent tail; and
applying a modulation voltage to said evanescent tail;
an optical confinement factor of said electro-absorption material, Γ, between and 1% and 5% enables the optical modulation of an optical power equal to or greater than 100 mW.

* * * * *

UNITED STATES PATENT AND TRADEMARK OFFICE
CERTIFICATE OF CORRECTION

PATENT NO. : 7,167,605 B2
APPLICATION NO. : 10/519204
DATED : January 23, 2007
INVENTOR(S) : Chang et al.

It is certified that error appears in the above-identified patent and that said Letters Patent is hereby corrected as shown below:

Column 6, line 4, please delete "$G_{RF} = (I_o \cdot \eta_{ins} \cdot \partial T/\partial v \cdot \eta_{det})^2 \cdot R_{in} \cdot R_{in} \cdot R_{out}$" and insert -- $G_{RF} = (I_o \cdot \eta_{ins} \cdot \partial T/\partial v \cdot \eta_{det})^2 \cdot R_{in} \cdot R_{out}$ -- therefor.

Column 7, line 20, after "disposed on said", please delete "BA" and insert --EA-- therefor.

Signed and Sealed this

Fourteenth Day of August, 2007

JON W. DUDAS
*Director of the United States Patent and Trademark Office*